(12) United States Patent
Fang et al.

(10) Patent No.: US 9,182,630 B2
(45) Date of Patent: Nov. 10, 2015

(54) BACKLIGHT MODULE AND LIQUID CRYSTAL DISPLAY

(75) Inventors: Kuojun Fang, Shenzhen (CN); Jianfa Huang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/511,709

(22) PCT Filed: Apr. 10, 2012

(86) PCT No.: PCT/CN2012/073727
§ 371 (c)(1),
(2), (4) Date: May 24, 2012

(87) PCT Pub. No.: WO2013/149406
PCT Pub. Date: Oct. 10, 2013

(65) Prior Publication Data
US 2015/0023003 A1   Jan. 22, 2015

(30) Foreign Application Priority Data
Apr. 5, 2012 (CN) .......................... 2012 1 0098528

(51) Int. Cl.
| G02F 1/1335 | (2006.01) |
| G02F 1/13357 | (2006.01) |
| F21V 8/00 | (2006.01) |
| G02F 1/1333 | (2006.01) |

(52) U.S. Cl.
CPC ........ *G02F 1/133605* (2013.01); *G02B 6/0096* (2013.01); *G02F 1/133385* (2013.01); *G02F 1/133611* (2013.01); *G02B 6/0031* (2013.01); *G02B 6/0055* (2013.01); *G02F 1/133603* (2013.01)

(58) Field of Classification Search
CPC ............ G02B 6/0056; G02F 1/133605; G02F 1/133602
USPC ............ 362/609, 97.1–97.2, 610; 349/65, 67, 349/63, 68
See application file for complete search history.

(56) References Cited

U.S. PATENT DOCUMENTS

| 2003/0095399 A1* | 5/2003 | Grenda et al. ................. 362/30 |
| 2005/0128374 A1* | 6/2005 | Furukawa ....................... 349/56 |
| 2008/0062714 A1* | 3/2008 | Kim et al. ..................... 362/609 |
| 2009/0141212 A1* | 6/2009 | Harbers et al. ................. 349/67 |
| 2011/0012942 A1* | 1/2011 | Kim et al. ..................... 345/690 |
| 2011/0026269 A1* | 2/2011 | Oh ................................ 362/607 |

* cited by examiner

*Primary Examiner* — Karabi Guharay
(74) *Attorney, Agent, or Firm* — Mark M. Friedman

(57) ABSTRACT

A backlight module and a liquid crystal display are provided. The backlight module includes a first light-emitting unit and at least one second light-emitting unit. The first light-emitting unit is located outside of a light guide region between an optical film and a reflection plate, and the at least one second light-emitting unit is located within the light guide region. The at least one second light-emitting unit includes a curved reflection sheet. The curved reflection sheet faces the first light-emitting unit, and is used to reflect the lights being projected to the at least one second light-emitting unit unto the optical film.

14 Claims, 3 Drawing Sheets

BACKLIGHT MODULE AND LIQUID CRYSTAL DISPLAY

BACKGROUND OF THE INVENTION

1. Field of the Invention

The present invention relates to a liquid crystal displaying technology field, and more particularly to a backlight module and a liquid crystal display.

2. Description of the Prior Art

With the continuous development of a liquid crystal displaying technology, the demand for the function of every component of the liquid crystal display becomes more and more high.

Please refer to FIG. 1, FIG. 1 is a structure schematic view of a backlight module of the prior art.

The backlight module includes a light source 11, a reflection cover 12, a reflection plate 13 and an optical film 14.

The reflection plate 13 is located under the optical film 14 and is parallel to the optical film 14. There forms a light guide region Q between the reflection plate 13 and the optical film 14. The light source 11 is disposed in the reflection cover 12. The reflection cover 12 can reflect the lights of the light source 11 unto the reflection plate 13 or the optical film 14.

Please continue to refer to FIG. 1, the transmission distance K of the light in the light guide region Q and the height H of the light guide region Q are interacted with each other. Only if the value of K/H is less than 40, the uniformity requirement of the luminance can be satisfied.

However, with the continuous development of the large-sized liquid crystal display, the transmission distance K of the lights will increase. For maintaining the uniformity luminance, the height H of the light guide region Q needs to increase. But this will undoubtedly increase the thickness of backlight module, and contravenes the developing trend of the lightweight liquid crystal display.

Hence, it is one of the technical problems needed to be solved in the liquid crystal displaying technology field that how to reduce or maintain the thickness of the backlight module under the case of the increasing size of the liquid crystal display.

BRIEF SUMMARY OF THE INVENTION

One object of the present invention is to provide a backlight module to solve the technical problems of the continuous increasing thickness of the backlight module under the case of the increasing size of the liquid crystal display in the prior art.

For solving above problems, the present invention provides a backlight module, comprising an optical film and a reflection plate being in parallel and opposite to the optical film. The optical film and the reflection plate form a light guide region therebetween, wherein the backlight module further comprises a first light-emitting unit and multiple second light-emitting units, which are used to project the lights to the light guide region;

the first light-emitting unit is located outside of the light guide region, the first light-emitting unit includes a light source and a first reflection cover, and the light source is disposed within the first reflection cover;

the second light-emitting units is located within the light guide region, and each of the second light-emitting units includes a second reflection cover, a light source located within the second reflection cover, and a curved reflection sheet, the orientation of which is contrary to that of the second reflection cover, wherein the orientations of the second reflection covers of the second light-emitting units are all the same;

wherein the orientation of the first reflection cover of the first light-emitting unit is same as those of the second reflection covers of the second light-emitting units.

In the backlight module of the present invention, the curved reflection sheet and the second reflection cover of the second light-emitting unit are connected with each other.

In the backlight module of the present invention, the curved reflection sheet and the second reflection cover of the second light-emitting unit form a gap therebetween.

In the backlight module of the present invention, the backlight module further comprises heat-radiating components or circuit components, which are disposed within the gap.

Another object of the present invention is to provide a backlight module to solve the technical problems of the continuous increasing thickness of the backlight module under the case of the increasing size of the liquid crystal display in the prior art.

For solving above problems, the present invention provides a backlight module, comprising an optical film and a reflection plate being in parallel and opposite to the optical film. The optical film and the reflection plate form a light guide region therebetween, wherein the backlight module also comprises a first light-emitting unit and at least one second light-emitting unit, which are used to project the lights to the light guide region;

the first light-emitting unit is located outside of the light guide region, the at least one second light-emitting unit is located within the light guide region, the light-projecting directions of the first light-emitting unit and the at least one second light-emitting unit are the same;

the at least one second light-emitting unit includes a curved reflection sheet, which faces the first light-emitting unit and is used to reflect the lights being projected to the at least one second light-emitting unit unto the optical film.

In the backlight module of the present invention, the first light-emitting unit and the at least one second light-emitting unit all include a light source and a reflection cover, the light source is disposed within the reflection cover, the orientations of the reflection covers of the first light-emitting unit and the at least one second light-emitting unit are the same, the curved reflection sheet and the reflection cover of the at least one second light-emitting unit are connected with each other and have contrary orientations.

In the backlight module of the present invention, the curved reflection sheet and the second reflection cover of the second light-emitting unit form a gap therebetween, and the backlight module further comprises heat-radiating components or circuit components, which are disposed within the gap.

In the backlight module of the present invention, there further disposes multiple second light-emitting units in the light guide region, the light-projecting directions of the multiple second light-emitting units are all same as that of the at least one second light-emitting unit, and all of the second light-emitting units include a reflection cover, a light source located within the reflection cover, and a curved reflection sheet connected to the reflection cover and having the orientation contrary to the orientation of the reflection cover, wherein the orientations of the reflection covers of all of the second light-emitting units are the same.

In the backlight module of the present invention, the backlight module further comprises another first light-emitting unit and another second light-emitting unit, which are separately symmetrical to the first light-emitting unit and the at least one second light-emitting unit.

Another object of the present invention is to provide a liquid crystal display to solve the technical problems of the continuous increasing thickness of the backlight module under the case of the increasing size of the liquid crystal display in the prior art.

For solving above problems, the present invention provides a liquid crystal display, comprising a backlight module. The backlight module comprises an optical film and a reflection plate being in parallel and opposite to the optical film. The optical film and the reflection plate form a light guide region therebetween, wherein the backlight module also comprises a first light-emitting unit and at least one second light-emitting unit, which are used to project the lights to the light guide region;

the first light-emitting unit is located outside of the light guide region, the at least one second light-emitting unit is located within the light guide region, the light-projecting directions of the first light-emitting unit and the at least one second light-emitting unit are the same;

the at least one second light-emitting unit includes a curved reflection sheet, which faces the first light-emitting unit and is used to reflect the lights being projected to the at least one second light-emitting unit unto the optical film.

In the liquid crystal display of the present invention, the first light-emitting unit and the at least one second light-emitting unit all include a light source and a reflection cover, the light source is disposed within the reflection cover, the orientations of the reflection covers of the first light-emitting unit and the at least one second light-emitting unit are the same, the curved reflection sheet and the reflection cover of the at least one second light-emitting unit are connected with each other and have contrary orientations.

In the liquid crystal display of the present invention, the curved reflection sheet and the second reflection cover of the second light-emitting unit form a gap therebetween, and the backlight module further comprises heat-radiating components or circuit components, which are disposed within the gap.

In the liquid crystal display of the present invention, there further disposes multiple second light-emitting units in the light guide region, the light-projecting directions of the multiple second light-emitting units are all same as that of the at least one second light-emitting unit, and all of the second light-emitting units include a reflection cover, a light source located within the reflection cover, and a curved reflection sheet connected to the reflection cover and having the orientation contrary to the orientation of the reflection cover, wherein the orientations of the reflection covers of all of the second light-emitting units are the same.

In the liquid crystal display of the present invention, the backlight module further comprises another first light-emitting unit and another second light-emitting unit, which are separately symmetrical to the first light-emitting unit and the at least one second light-emitting unit.

Comparing with the prior art, the backlight module and the liquid crystal display of the present invention dispose a first light-emitting unit outside of the light guide region between the optical film and the reflection plate, and at least one second light-emitting unit within the light guide region. The second light-emitting unit includes a curved reflection sheet, which can reflect the received lights to the optical film. Obviously, even if the size of the liquid crystal display increases, the present invention need not increase the thickness of the backlight module, thereby ensuring the preferred lighting effect of the backlight module.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

The following description of every embodiment with reference to the accompanying drawings is used to exemplify a specific embodiment, which may be carried out in the present invention.

Figure 1:
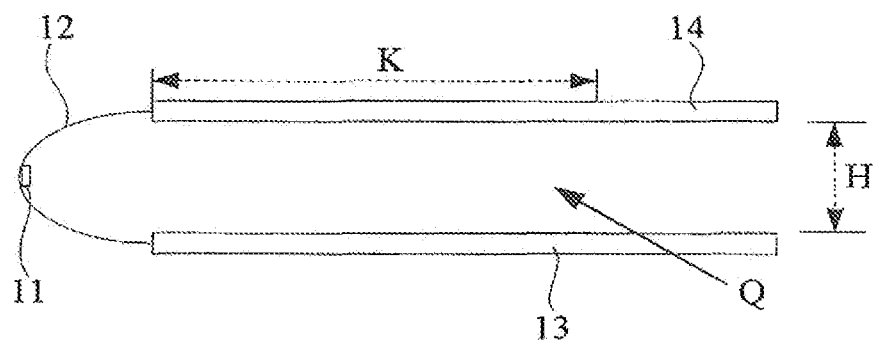
FIG. 1 is a structure schematic view of a backlight module of the prior art.
Figure 2:
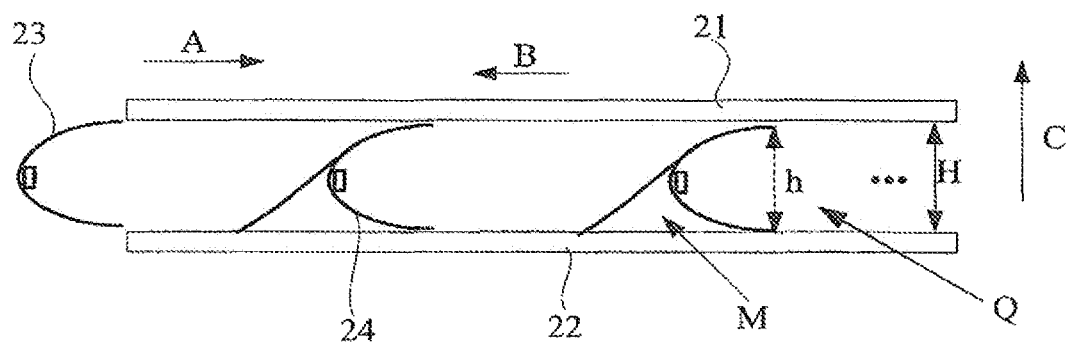
FIG. 2 is a structure schematic view of a first preferred embodiment of a backlight module of the present invention.

Please refer to FIG. 2, FIG. 2 is a structure schematic view of a first preferred embodiment of a backlight module of the present invention.

The backlight module includes an optical film 21, a reflection plate 22, a first light-emitting unit 23 and at least one second light-emitting unit 24. The optical film 21 and the reflection plate 22 are in parallel and opposite each other, and form a light guide region Q therebetween. Wherein, the first light-emitting unit 23 is located outside of the light guide region Q, and the second light-emitting unit 24 is located within the light guide region Q. The light-projecting directions of the first light-emitting unit 23 and the second light-emitting unit 24 are the same.

Figure 3:
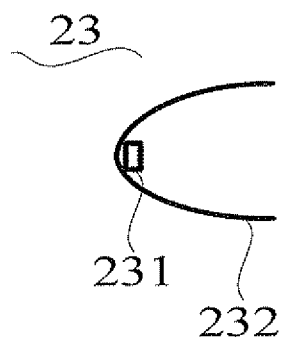
FIG. 3 is a structure schematic view of a first light-emitting unit adopted by the backlight module of the present invention.

Please refer to FIG. 3, FIG. 3 is a structure schematic view of the first light-emitting unit 23 of the backlight module of the present invention shown in FIG. 2. The first light-emitting unit 23 includes a first light source 231 and a first reflection cover 232. The first light source 231 is located within the first reflection cover 232, and is generally half enclosed by the first reflection cover 232. The first reflection cover 232 is preferably a parabola collimator. Of course, the first reflection cover 232 also may be other type collimators, only if the lights of the first light source 231 can be projected to the light guide region Q after being collimated, so here no detail is described.

Figure 4:
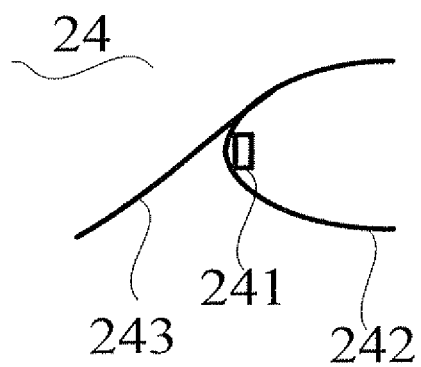
FIG. 4 is a structure schematic view of a second light-emitting unit adopted by the backlight module of the present invention.

Please refer to FIG. 4, FIG. 4 is a structure schematic view of the second light-emitting unit 24 of the present invention shown in FIG. 2. The second light-emitting unit 24 includes a second light source 241, a second reflection cover 242 and a curved reflection sheet 243. The second light source 241 is located within the second reflection cover 242, and is generally half enclosed by the second reflection cover 242. The curved reflection sheet 243 is connected to the second reflection cover 242. In this embodiment, the second reflection cover 242 is preferably a parabola collimator. Similarly, the second reflection cover 242 also may be other type collimators, only if the lights of the first light source 231 can be projected to the light guide region Q after being collimated, so here no detail is described again.

Wherein, the shapes of above first reflection cover 232 and above second reflection cover 242 are the same and the orientations of the both also are the same, as shown in FIG. 2, the orientations of the both is along a direction A. Accordingly, the light-projecting directions of the first light-emitting unit 23 and the second light-emitting unit 24 are the same.

Preferably, the curved reflection sheet 243 and the second reflection cover 242 may be connected together by the integral forming way. In other embodiments, the curved reflection sheet 243 also may be an extension body, which is formed on the reflection plate 22 and then connected with the second reflection cover 242. Namely, the curved reflection sheet 243 may be one piece with the reflection plate 22. Of course, the existing manner of the curved reflection sheet 243 can not be limited to above two modes, but it also may be a separate member, so no more repeated herein.

Furthermore, the orientation of the curved reflection sheet 243 is contrary to that of the second reflection cover 242. As shown in FIG. 2, the orientation of the curved reflection sheet 243 is generally along a direction B contrary to the direction A, thereby the lights projected to the curved reflection sheet 243 can be reflected to the optical film 21.

As shown in FIG. 2, the backlight module of the present invention also may dispose multiple second light-emitting units 24 along the direction A in the light guide region Q according to the optical demand, wherein these second light-emitting unit 24 are arranged according to the same light-projecting direction (or orientation) in sequence. In detail, the orientation of the second reflection cover 242 of each second light-emitting unit 24 is same as that of the first reflection cover 232 of the first light-emitting unit 23, but the orientation of the curved reflection sheet 243 of each second light-emitting unit 24 is contrary to that of the first reflection cover 232 of the first light-emitting unit 23. Accordingly, the curved reflection sheet 243 located between the adjacent two second reflection covers 242 can be used to reflect the lights, between the adjacent two second reflection covers 242 and projected to the curved reflection sheet 243, to the optical film 21.

As shown in FIG. 4, the curved reflection sheet 243 has a curved structure, which may consist of multiple bent planes, or be a smooth curved surface and so on, only if the received lights can be reflected to the optical film 21, so no more one by one repeated herein.

In the first preferred embodiment of FIG. 2, the backlight module adopts a single side-light mode. Namely both the first light-emitting unit 23 and the second light-emitting unit 24 can generally project the lights into the light guide region Q along the direction A.

Please continue to refer to FIG. 2, the curved reflection sheet 243 and the reflection cover 242 of the second light-emitting unit 24 form a gap M therebetween. The gap M may accommodate heat-radiating components or circuit components and so on, or accommodate other components. These designs are all included in the protect scope of the present invention, and here no more detail describe.

Please refer to FIG. 2 again, in a direction C perpendicular to the optical film 21, the curved reflection sheet 243 has a refection height h, and the light guide region Q of the backlight module has a light-guiding thickness H. In the embodiment, the refection height h is equal to the light-guiding thickness H, thereby ensuring that the lights can not pass through the second light-emitting unit 24, and further ensuring a preferred light-guiding effect.

the working principle of the first preferred embodiment of the backlight module shown in FIG. 2 to FIG. 4 is as follows:

The first light-emitting unit 23 is disposed outside of the light guide region Q, and an opening portion of the first reflection cover 232 of the first light-emitting unit 23 is connected with the reflection plate 22 and the optical film 21. At least one second light-emitting unit 24 is located within the light guide region Q, and the orientation of the second reflection cover 242 of the second light-emitting unit 24 is same as that of first reflection cover 232, namely along the direction A.

When the backlight module works, the lights emitted from the first light source 231 are reflected and collimated by the first reflection cover 232, and then enter into the light guide region Q. For the lights entering into the light guide region Q, one portion thereof directly enters into the optical film 21, and another portion thereof is projected to the reflection plate 22. One portion of the lights projected to the reflection plate 22 is reflected to the optical film 21 by the reflection plate 22, and another portion thereof is reflected to the curved reflection sheet 243 of the second light-emitting unit 24 by the reflection plate 22, and then enters into the optical film 21 after being reflected by the curved reflection sheet 243.

Of course, one portion of the lights projected to the curved reflection sheet 243 is coming from the first light source 231, and all the lights received by the curved reflection sheet 243 are reflected to the optical film 21. It can be seen that, the lights emitted by the first light-emitting unit 23 all can enter into the optical film 21 after being continuously reflected by the first reflection cover 232, the reflection plate 22 and the curved reflection sheet 243.

Similarly, the lights emitted by the second light source 241 of the second light-emitting unit 24 also all can enter into the optical film 21 after being continuously reflected by the second reflection cover 232 of the second light-emitting unit 24, the reflection plate 22 and the curved reflection sheet 243 of another second light-emitting unit 24 adjacent to the second light-emitting unit 24.

Obviously, because there disposes at least one second light-emitting unit 24 within the light guide region Q, the curved reflection sheet 243 of the second light-emitting unit 24 may reflect the received lights to the optical film 21. Accordingly, the present invention can set the number of the second light-emitting unit 24 according to the size of the liquid crystal display, even if the size of the liquid crystal display continuously increase, the light-guiding effect can be ensured by adjusting the number of the second light-emitting unit 24, so no need to increase the thickness of the backlight module.

Figure 5:
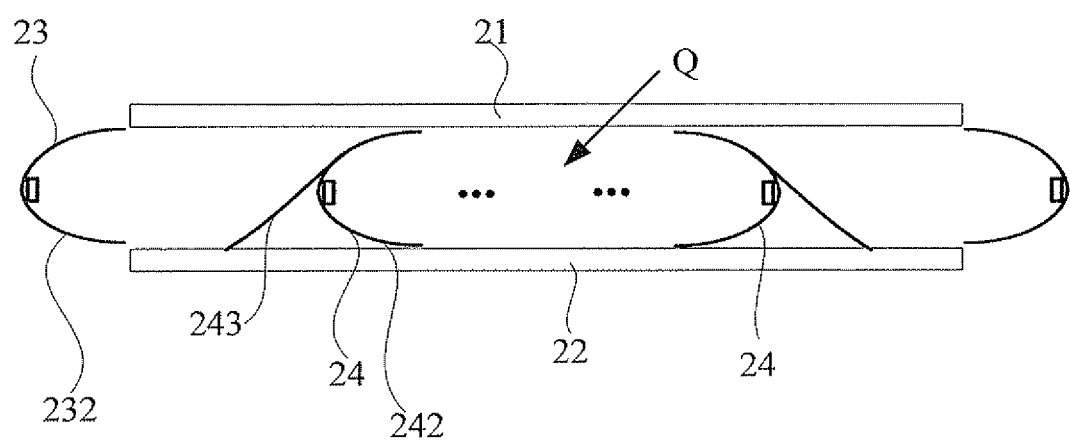
FIG. 5 is a structure schematic view of a second preferred embodiment of a backlight module of the present invention.

FIG. 5 is a structure schematic view of a second preferred embodiment of the backlight module of the present invention.

The difference with the single side-light mode of the first preferred embodiment shown in FIG. 2 is in that: the second preferred embodiment shown in FIG. 5 adopts a double side-light mode. The backlight module of the second preferred embodiment includes two opposite first light-emitting units 23 symmetrically located on two sides of the optical film 21, and two opposite second light-emitting units 24 symmetrically located within the light guide region Q. Furthermore, the orientation of the first reflection cover 232 of each first light-emitting unit 23 is same as that of the second reflection cover 242 of the second light-emitting unit 24 adjacent to the first light-emitting unit 23, but is opposite to that of the curved reflection sheet 243 of the second light-emitting unit 24 adjacent to the first light-emitting unit 23.

In view of the structure of the second preferred embodiment shown in FIG. 5 being similar to that of the first preferred embodiment shown in FIG. 2, the working principle of the FIG. 5 can refer to the description of FIG. 2, and no more repeated herein.

The present invention also provides a liquid crystal display, which comprises the backlight module provided by the present invention. The backlight module has been detail described in the above text, so no more repeated herein.

In a word, the backlight module and the liquid crystal display having the backlight module in the present invention dispose the first light-emitting unit outside of the light guide region constructed by the optical film and the reflection plate, and at least one second light-emitting unit within the light guide region. Moreover, the second light-emitting unit disposes a curved reflection sheet, which can reflect the received lights to the optical film. Obviously, even if the size of the liquid crystal display increases, the present invention need not increase the thickness of the backlight module, thereby ensuring the preferred lighting effect of the backlight module.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A backlight module, comprising an optical film and a reflection plate being in parallel and opposite to the optical film, the optical film and the reflection plate forming a light guide region therebetween, wherein the backlight module further comprising a first light-emitting unit and multiple second light-emitting units, which are used to project the lights to the light guide region;
   the first light-emitting unit being located outside of the light guide region, the first light-emitting unit including a light source and a first reflection cover, the light source being disposed within the first reflection cover;
   the second light-emitting units being located within the light guide region, and each of the second light-emitting units including a second reflection cover, a light source located within the second reflection cover, and a curved reflection sheet, the orientation of which is contrary to that of the second reflection cover, wherein the orientations of the second reflection covers of the second light-emitting units being all the same;
   wherein the orientation of the first reflection cover of the first light-emitting unit is same as those of the second reflection covers of the second light-emitting units.

2. The backlight module as claimed in claim 1, wherein the curved reflection sheet and the second reflection cover of the second light-emitting unit are connected with each other.

3. The backlight module as claimed in claim 1, wherein the curved reflection sheet and the second reflection cover of the second light-emitting unit form a gap therebetween.

4. The backlight module as claimed in claim 1, wherein the backlight module further comprises heat-radiating components or circuit components, which are disposed within the gap.

5. A backlight module, comprising an optical film and a reflection plate being in parallel and opposite to the optical film, the optical film and the reflection plate forming a light guide region therebetween, wherein the backlight module also comprising a first light-emitting unit and at least one second light-emitting unit, which are used to project the lights to the light guide region;
   the first light-emitting unit being located outside of the light guide region, the at least one second light-emitting unit being located within the light guide region, the light-projecting directions of the first light-emitting unit and the at least one second light-emitting unit being the same;
   the at least one second light-emitting unit including a curved reflection sheet, which faces the first light-emitting unit and is used to reflect the lights being projected to the at least one second light-emitting unit unto the optical film.

6. The backlight module as claimed in claim 5, wherein the first light-emitting unit and the at least one second light-emitting unit all include a light source and a reflection cover, the light source is disposed within the reflection cover, the orientations of the reflection covers of the first light-emitting unit and the at least one second light-emitting unit are the same, the curved reflection sheet and the reflection cover of the at least one second light-emitting unit are connected with each other and have contrary orientations.

7. The backlight module as claimed in claim 6, wherein the curved reflection sheet and the second reflection cover of the second light-emitting unit form a gap therebetween, and the backlight module further comprises heat-radiating components or circuit components, which are disposed within the gap.

8. The backlight module as claimed in claim 6, wherein there further disposes multiple second light-emitting units in the light guide region, the light-projecting directions of the multiple second light-emitting units are all same as that of the at least one second light-emitting unit, and all of the second light-emitting units include a reflection cover, a light source located within the reflection cover, and a curved reflection sheet connected to the reflection cover and having the orientation contrary to the orientation of the reflection cover, wherein the orientations of the reflection covers of all of the second light-emitting units being the same.

9. The backlight module as claimed in claim 5, wherein the backlight module further comprises another first light-emitting unit and another second light-emitting unit, which are separately symmetrical to the first light-emitting unit and the at least one second light-emitting unit.

10. A liquid crystal display, wherein, comprising a backlight module, the backlight module comprising an optical film and a reflection plate being in parallel and opposite to the optical film, the optical film and the reflection plate forming a light guide region therebetween, wherein the backlight module also comprising a first light-emitting unit and at least one second light-emitting unit, which are used to project the lights to the light guide region;
    the first light-emitting unit being located outside of the light guide region, the at least one second light-emitting unit being located within the light guide region, the light-projecting directions of the first light-emitting unit and the at least one second light-emitting unit being the same;
    the at least one second light-emitting unit including a curved reflection sheet, which faces the first light-emitting unit and is used to reflect the lights being projected to the at least one second light-emitting unit unto the optical film.

11. The liquid crystal display as claimed in claim 10, wherein the first light-emitting unit and the at least one second light-emitting unit all include a light source and a reflection cover, the light source is disposed within the reflection cover, the orientations of the reflection covers of the first light-emitting unit and the at least one second light-emitting unit are the same, the curved reflection sheet and the reflection cover of the at least one second light-emitting unit are connected with each other and have contrary orientations.

12. The liquid crystal display as claimed in claim 11, wherein the curved reflection sheet and the second reflection cover of the second light-emitting unit form a gap therebetween, and the backlight module further comprises heat-radiating components or circuit components, which are disposed within the gap.

13. The liquid crystal display as claimed in claim 11, wherein there further disposes multiple second light-emitting units in the light guide region, the light-projecting directions of the multiple second light-emitting units are all same as that of the at least one second light-emitting unit, and all of the second light-emitting units include a reflection cover, a light source located within the reflection cover, and a curved reflection sheet connected to the reflection cover and having the orientation contrary to the orientation of the reflection cover, wherein the orientations of the reflection covers of all of the second light-emitting units are the same.

14. The liquid crystal display as claimed in claim 10, wherein the backlight module further comprises another first light-emitting unit and another second light-emitting unit, which are separately symmetrical to the first light-emitting unit and the at least one second light-emitting unit.

* * * * *